United States Patent

Graessley et al.

[11] Patent Number: 5,535,722
[45] Date of Patent: Jul. 16, 1996

[54] KNOCK DETECTION SYSTEM AND CONTROL METHOD FOR AN INTERNAL COMBUSTION ENGINE

[75] Inventors: William J. Graessley, Ypsilanti; James Zehnal, Livonia; Kevin R. Carlstrom, Dearborn Heights; Mitchell A. Deperno, Royal Oak; Daniel P. Bartolucci, Canton; James W. Forbes, Farmington, all of Mich.

[73] Assignee: Ford Motor Company, Dearborn, Mich.

[21] Appl. No.: 265,894

[22] Filed: Jun. 27, 1994

[51] Int. Cl.⁶ ........................................................ F02P 5/14
[52] U.S. Cl. ................................................................. 123/425
[58] Field of Search ............................... 123/425, 435; 73/35; 364/431.08, 431.01, 431.04

[56] References Cited

U.S. PATENT DOCUMENTS

| | | | |
|---|---|---|---|
| Re. 32,667 | 5/1988 | Staerzl | 123/435 |
| 4,750,103 | 6/1988 | Abo et al. | 364/431.08 |
| 4,761,992 | 8/1988 | Staerzl | 73/35 |
| 5,146,777 | 9/1992 | Polito et al. | 73/35 |
| 5,163,404 | 11/1992 | Witkowski et al. | 123/425 |
| 5,230,316 | 7/1993 | Ichihara et al. | 123/425 |
| 5,267,164 | 11/1993 | Miyama | 364/431.08 |
| 5,284,116 | 2/1994 | Richeson, Jr. | 123/425 |
| 5,287,837 | 2/1994 | Hasimoto et al. | 123/425 |
| 5,321,973 | 6/1994 | Sogawa | 73/35 |
| 5,339,245 | 8/1994 | Hirata et al. | 364/431.08 |
| 5,359,883 | 11/1994 | Baldwin et al. | 73/117.3 |
| 5,388,560 | 2/1995 | Hisaki et al. | 123/630 |
| 5,404,854 | 4/1995 | Kamabora et al. | 123/425 |

Primary Examiner—Raymond A. Nelli
Attorney, Agent, or Firm—Peter Abolins; Roger L. May

[57] ABSTRACT

A knock control system for internal combustion engines comprising a knock sensor and a knock detection circuit that uses an electronic engine controller. The knock sensor creates an electrical output signal indicating the presence of engine structure vibrations resulting from engine combustion characteristics. The circuit filters the knock sensor signal, time gated at independent crankshaft angles, and transfers it to a noise channel and to a knock channel. A comparator distinguishes between background vibration and vibrations during the combustion event that are due to knock. The knock detection function, along with the crankshaft angle position reference signal, develops time gated "snapshot" signals indicating the magnitudes for both the background noise and the vibrations created by denotation and distinguishes between them. These signals are processed by the knock detection system along with the engine controller's other system variables to influence engine control parameter changes to prevent further knock.

8 Claims, 5 Drawing Sheets

Fig. 10

KNOCK DETECTION SYSTEM AND CONTROL METHOD FOR AN INTERNAL COMBUSTION ENGINE

TECHNICAL FIELD

The invention relates to electronic engine controls for internal combustion engines, particularly automotive vehicle engines having multiple cylinders.

BACKGROUND OF THE INVENTION

In a conventional internal combustion engine for automotive vehicles, a fuel and air mixture is provided in correct proportions and a spark is used for igniting the air/fuel mixture. The spark is timed in relation to the position of the pistons in the engine cylinders to generate maximum torque while avoiding abnormal combustion of the air/fuel mixture. The variables that influence the optimum spark timing for any given operating condition include engine speed, manifold pressure, coolant temperature, intake air temperature, ambient pressure, and fuel octane. The correct spark timing based upon the instantaneous values for these variables is stored in a look-up table in the memory of a microprocessor, which forms a part of the electronic engine control system.

The engine control system obtains readings from various sensors whose signals are a measure of the combustion variables and generates an appropriate address to the look-up table in ROM. The control system then computes the correct spark advance for each cylinder.

Generally, advancing the spark toward top dead center for each cylinder increases the torque until a point at which maximum torque is achieved. If the spark is advanced too far, abnormal combustion known as knocking or pre-detonation will occur. This is characterized by an abnormally rapid rise in cylinder pressure during combustion. That rapid rise in pressure is followed by pressure oscillations, the frequency of which is specific to a given engine configuration and cylinder dimension. Typically, the frequency is in a relatively narrow range of only a few kilohertz.

A relatively low energy level of knock arguably is beneficial to engine performance, but audible knock may result in vehicle operator dissatisfaction, and excessive knock can damage the engine. A typical control strategy will distinguish between acceptable and unacceptable levels of knock. The engine control will advance the spark until the knock level becomes unacceptable. This is determined empirically. At that point, the control system will reduce the spark advance until an acceptable level of knock is achieved.

A control system of this type requires a knock sensor that responds to engine vibration energy and functions in the spectrum of rapid cylinder pressure oscillations. Accurate control of knock permits the engine to be calibrated closer to the optimum ignition timing.

The degree of knock depends upon the amount of energy available and the rate of combustion of the end gas. Factors that have an effect on the degree of knock include cylinder temperature, volumetric efficiency, residual burned charge, air/fuel ratio, spark timing, octane, homogeneity of the air/fuel mixture, cylinder geometry, compression ratio, and the amount of unburned fuel in the end gas when it auto-ignites.

Since many of these variables change from cycle to cycle and from cylinder to cylinder, the level of knock also changes from cycle to cycle and from cylinder to cylinder. Therefore, knocking is a random phenomenon, and any variable that affects the combustion process or changes the mass, pressure, temperature, or composition of the end gas contributes to knock intensity and rate of occurrence.

We are aware of knock detection systems that include audio transducers for converting audio signals indicative of abnormal engine combustion into an output voltage that can be used by a microprocessor in controlling engine timing to eliminate knock. Examples of these prior art devices are described in U.S. Pat. Nos. 4,667,636 and 4,761,992. In the system of the '636 patent, an audio transducer is mounted adjacent to a cylinder in a multi-cylinder internal combustion engine. The cylinder that is selected is one that is more prone to knocking than the other cylinders. The signal that is obtained from the transducer is filtered and sampled. The voltage amplitudes of several samples are compared by a comparator circuit. If a sample that is measured at an instant later than a sample measured earlier in the combustion cycle is greater in magnitude by a predetermined amount, it is assumed that detonation is occurring and an appropriate signal is distributed to a fuel enrichment control or to a spark retard control, or to both, until the detonation is eliminated.

In the control system of the '992 patent, an audio transducer is used to sample a signal that includes a background noise portion and a portion that represents detonation. The portion of the signal that represents background noise is used to develop a bias for the gain of a control transistor. A detonation threshold detector responds to a predetermined increase in the amplitude of the portion of the signal voltage that represents detonation above the value that represents background noise and then develops an output signal that is used by the microprocessor to adjust spark timing or fuel supply.

BRIEF DESCRIPTION OF THE INVENTION

Unlike prior art systems that use a single time gate for developing a signal whose intensity will indicate detonation, our invention uses a dual window concept. Our system has two separate and independent time gates, called windows, that are synchronized with the crank angle to sample engine vibrations. The two windows are used during each combustion event for each cylinder. The first window samples the engine background noise, and the second window samples the harsh vibrations due to detonation during the combustion process. The samples are processed in the separate windows. The windows for each cylinder of the engine are placed at optimum crank angle positions to maximize the probability of detecting knock. Our improved system makes it possible to control the knock intensity at a sub-audible level through ignition timing thereby permitting the engine to operate at its maximum performance level.

The duration of the signal samples that are passed through each window is optimized to provide an accurate value of engine vibration energy and to develop a reliable signal-to-noise ratio for each cylinder. Both the knock signal and the noise signal that are passed through the separate channels are processed on an individual cylinder basis and in real time. This is in contrast to prior art systems, such as those mentioned above, that employ a single knock window wherein the current signal sample is compared to an average signal sample to identify engine knock. Averaging techniques are not used in our present system, which has a higher degree of discrimination between mechanically induced noise vibrations and combustion induced vibrations (i.e., knock) in each combustion event.

The knock sensor is mounted at a location on the engine where both the noise and combustion vibration signals from all cylinders can be measured over the entire speed and load operating range. However, since the mechanical transmissibility of vibrations to the knock sensor is different for each cylinder, the vibrations for each are analyzed on an individual basis.

It is possible with our improved system to reject noise from sources such as valves, the transmission, accessories, and other engine-mounted components. The system uses two separate electronic channels that are independent in both time gating and circuitry for handling differences between combustion event signals and noise signals.

The first of these two channels, the noise channel, is used to sample background engine noise. The window for this channel is placed at a crank angle where the background noise is relatively low and consistent from cycle to cycle and where knock is known not to occur. The width of the sampling window may vary from cylinder to cylinder. It also varies as engine speed increases to compensate for increased engine noise.

The second channel, the knock channel, is used to sample the knock sensor signal during the crank angle position at which knock is expected to occur but where noise from other sources is excluded. This sample is then compared to the noise sample taken immediately prior to the knock sample. This allows the present system to react immediately without being diluted by averaged previous samples as in prior art systems.

PARTICULAR DESCRIPTION OF THE INVENTION

Figure 1:
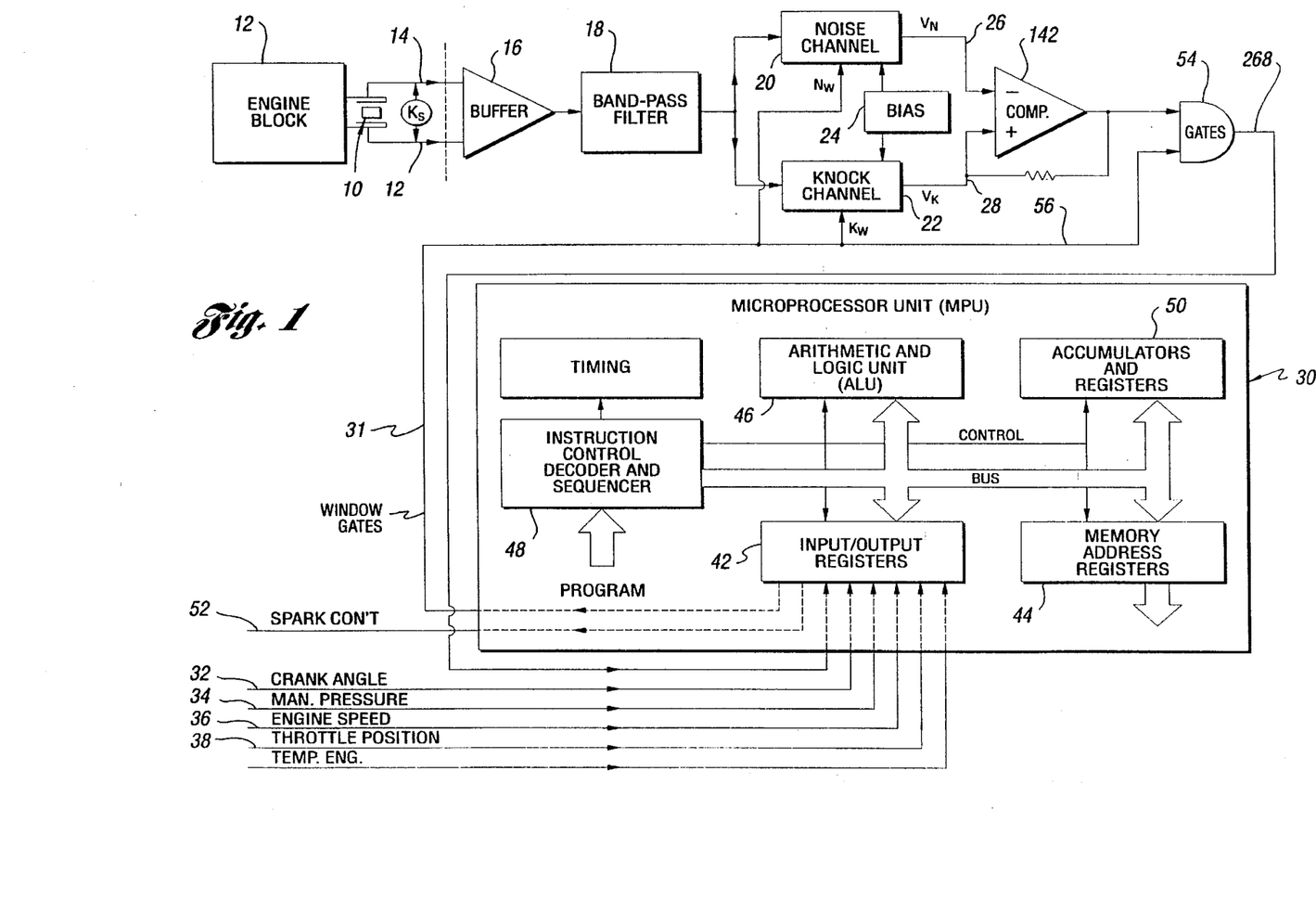
FIG. 1 is a dual window knock system functional block diagram embodying the improved system of our invention.

FIG. 1 shows a functional block diagram of our dual window knock detector system. It comprises a linear knock sensor 10 adapted to be mounted on the engine block 12 of an internal combustion engine at a location where it is capable of detecting signals from all cylinders.

The knock sensor used in our system is a piezoelectric sensor having an inertia mass that is spring biased into a force transmitting relationship with respect to a piezoelectric ceramic disk within a sensor housing.

The output of the sensor 10 is transferred through parallel input leads 12 and 14 to a buffer circuit 16. It includes a differential amplifier that achieves an input and an output impedance match and amplifies a signal from the sensor before it is passed to bandpass filter 18 centered about the fundamental knock frequency.

Figure 7:
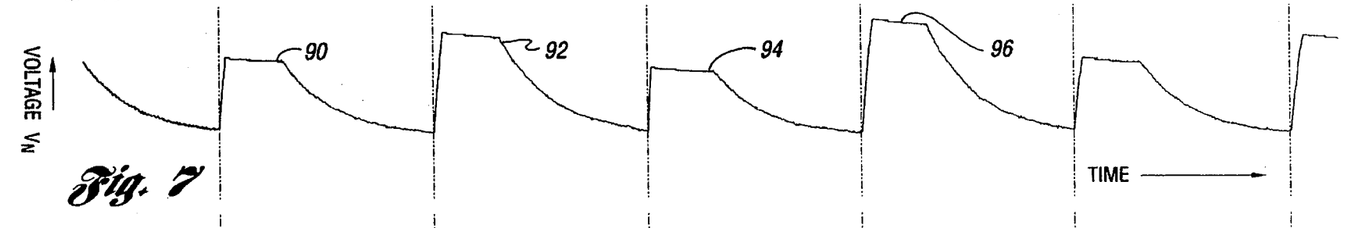
FIG. 7 is a chart showing the processed noise sample voltage that is gated by the noise window of the electronic circuit of our invention.

The output of the bandpass filter is buffered into separate circuits that are identified as a noise channel 20 and a knock channel 22. Each channel comprises operational amplifiers that utilize a bias voltage from a source indicated schematically at 24. When the noise channel $N_w$ is open, the processed noise signal $V_n$ is developed in signal flow path 26. The processed knock signal $V_k$ is developed through signal flow path 28 when the knock channel $K_w$ is open. The noise signal is a linear combination of the DC bias of the circuit and the output of the knock sensor. The amplitude of $V_n$, as seen in FIG. 7, is the product of the noise signal and the duration of noise window $N_w$.

Figure 8:
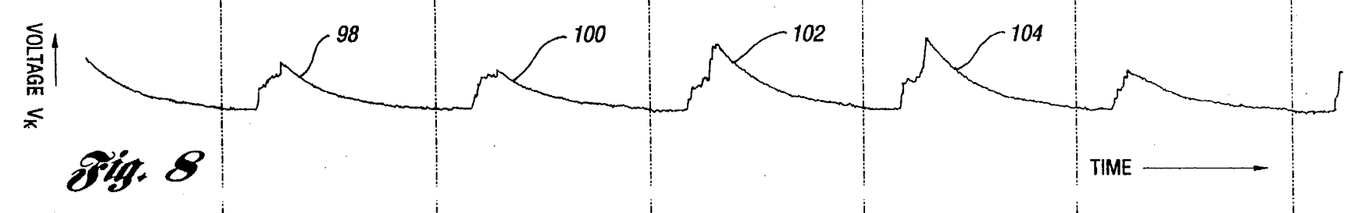
FIG. 8 is a plot of the processed knock sample voltage for the knock window circuit of our invention.

The processed knock signal $V_k$, as seen in FIG. 8, is obtained in the same manner, but the DC bias has a negligible contribution. The width of $K_w$ is chosen to contain the initial energy burst from the knock event, and is positioned to reject all other vibrational sources.

Both the noise channel 20 and the knock channel 22 are active when their respective control lines (windows) are open. The opening of the noise channel and the opening of the knock channel are controlled by a microprocessor unit 30. The noise channel is opened in advance of the opening of the knock channel. Its position is based on the initiation of a crank position reference signal for each of the engine cylinders. The knock channel is active after the noise channel closes and before the completion of the combustion event. The knock window signal and the noise window signal are delivered by the microprocessor through signal flow path 31 to path 56. The processed channel signals are compared in a comparator 27, which is further gated by the knock window through circuit 54. The output KIG informs the microprocessor that a knock situation exists.

The microprocessor also receives engine timing information through data flow path 32, an engine manifold pressure signal through signal flow path 34, engine speed data through signal flow path 36, throttle position data through signal flow path 38 and temperature data through signal control path 40. Other input information for the microprocessor 30 also can be used as needed.

The microprocessor acts upon the sensor information after it is stored in input/output registers 42. Using information stored in memory address registers 44, the arithmetic and logic unit 46 operates on the data. The result of the computation is a spark advance signal distributed through signal flow path 52 to a spark driver module (not shown).

Figure 2:
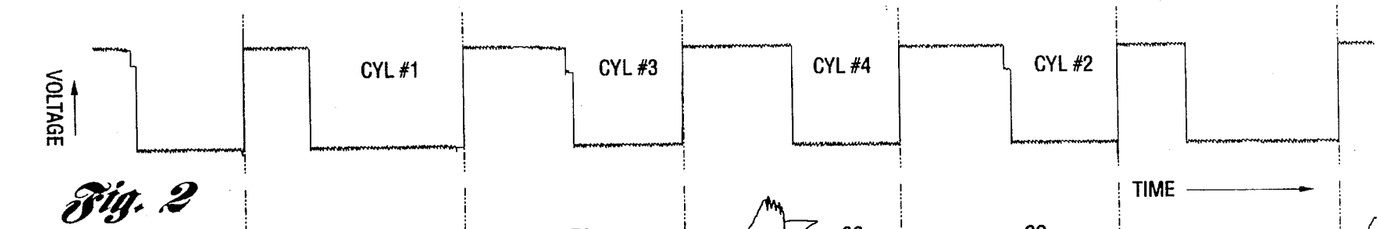
FIG. 2 is a graphic showing the crank timing pulses for a four cylinder internal combustion engine with cylinder identification indicated by a shorter pulse for cylinder 1.

FIG. 2 shows the crank position reference signals for cylinders 1, 3, 4 and 2. The crank position reference pulse width time for cylinder 1 is relatively short compared to the pulse width time for the other cylinders. This is done to permit the processor 30 to distinguish the first cylinder from the other cylinders. The leading edge of the crank angle reference pulse for all cylinders occurs preferably at approximately 10° before top dead center. The processor responds to the beginning of the pulse for each cylinder by triggering the operation of the noise window circuit.

Figure 4:
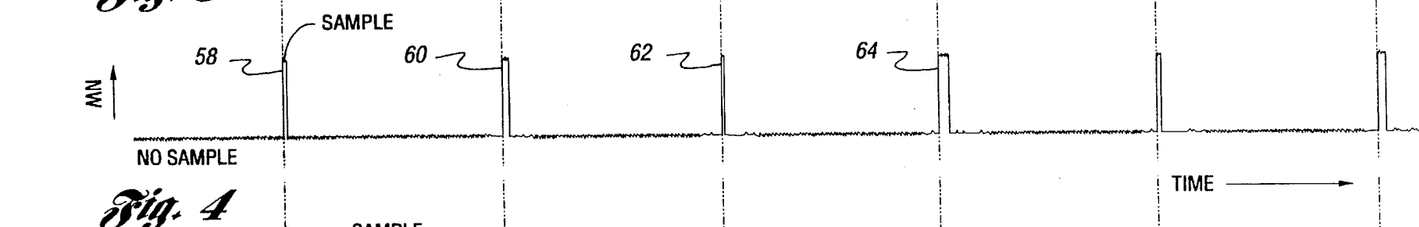
FIG. 4 is a graphic showing the noise window pulses for each combustion event.

As indicated in FIG. 4, the width of each of the noise window pulses shown at 58, 60, 62 and 64 is unique for each cylinder.

Figure 5:
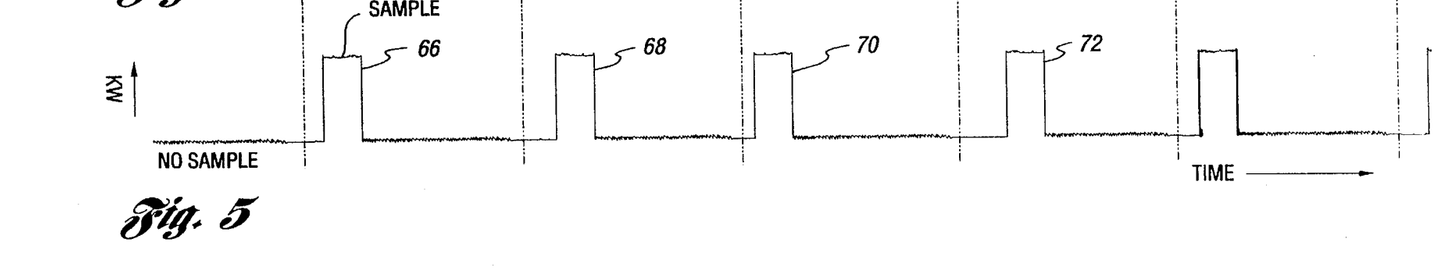
FIG. 5 is a graphic showing the knock window pulses for each combustion event.

FIG. 5 shows the sampling pulse for the knock window 66 for cylinder 1. Its width is greater than the width of the noise window 58. The corresponding knock window signals for cylinders 3, 4 and 2 are shown at 68, 70 and 72.

Figure 3:
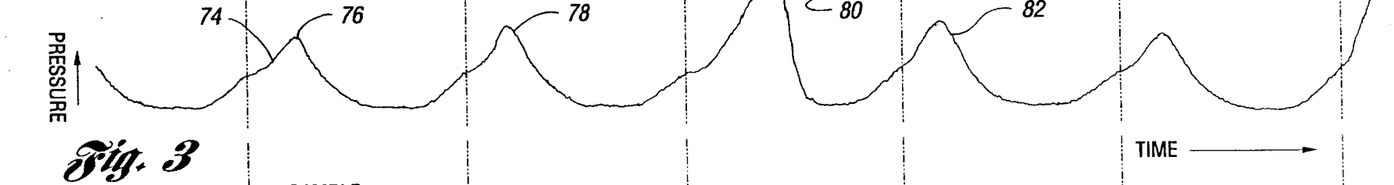
FIG. 3 is a graphic showing the combustion chamber pressure characteristics for each cylinder of a four cylinder engine.

FIG. 3 shows the pressure waveforms for each combustion event. The pressure waveform for cylinder 1, as indicated at 74, depicts normal combustion. The knock window signal 66 is placed where the pressure peak during combustion occurs as shown at 76. The corresponding pressure waveforms occurring during the combustion events for cylinders 3, 4 and 2 are indicated at 78, 80 and 82 respectively. It should be noted that pressure oscillations occur near the peak pressure for cylinder 4. This is because detonation occurs in cylinder 4 in the example illustrated.

Figure 6:
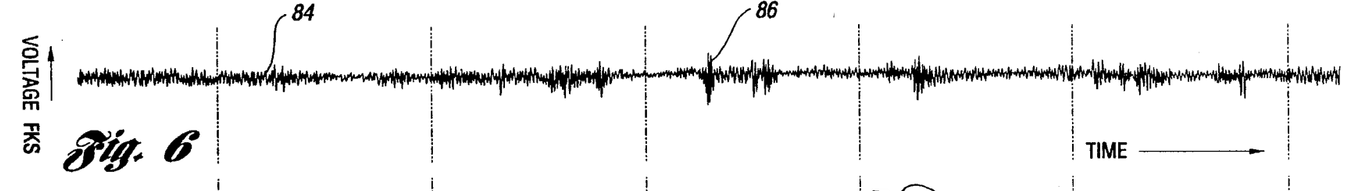
FIG. 6 is a plot of the output of the bandpass filtered sensor for the knock sensor.
Figure 9:
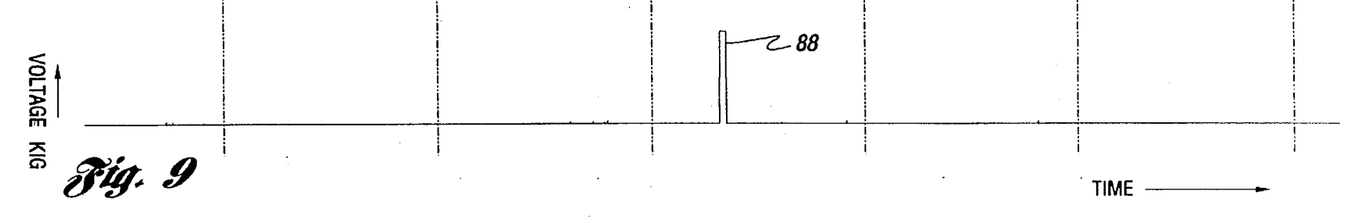
FIG. 9 is a plot showing the gated knock indicated output signal (KIG) when knock is detected.

The raw signal developed by the knock sensor is a random high frequency burst. The signal spectrum is nonuniform in its frequency and amplitude. The filtered output signal from the knock sensor is indicated in FIG. 6. The peak values, as shown at 84, do not exceed a value that would indicate the presence of detonation. It will be observed, however, that for cylinder 4, the peak value of the signal in FIG. 6 is relatively high, as indicated at 86. The high amplitude of the burst shown at 86 occurs within the time band sampled by the knock window signal 70. As a result of the detection of detonation at 86, the knock circuit will develop a knock indicated signal (KIG) as shown at 88, and the engine control microprocessor will respond to retard the spark until the intensity of knock subsides, as indicated by the signals to the right of the region 86 in FIG. 6. If there are no subsequent knock indications, the circuit will slowly advance the spark up to the threshold point of detonation to maintain engine performance.

The noise channel output voltage $V_n$ is plotted in FIG. 7 for each of the cylinders. The noise channel voltage for cylinder 1 is shown at 90, and the corresponding noise channel output voltages are shown for cylinders 3, 4 and 2 at 92, 94 and 96, respectively.

The knock channel voltage $V_k$ for cylinder 1 is shown in FIG. 8 at 98, and the corresponding knock channel voltages for cylinders 3, 4 and 2, respectively, are shown at 100, 102 and 104.

The linear accelerometer provides a wide band frequency response to cover the entire engine knocking spectrum while ensuring a fast response time. The input buffer stage shown in FIG. 1 at 16 provides a high impedance match with flat frequency response. The bandpass filter 18 is matched to the knock spectrum.

After the bandpass filter feeds the two independent channels (i.e., noise channel 20 and knock channel 22), the signal is amplified, filtered, offset biased, time-sampled and compared to determine knock, as will be explained with reference to FIG. 11.

The width of the knock window and the width of the noise window are calibrated for each cylinder. The noise signal is sampled during a "quiet" portion of the engine combustion event, and the knock signal is sampled during the combustion event when knock is expected to occur. The processed samples from each channel are compared during the knock window interval.

As mentioned earlier, the noise and knock window gating pulses are synchronized to the crank angle relative to top dead center. The output signals $V_n$ and $V_k$ for the noise channel and the knock channel, respectively, represent instantaneous relative magnitudes for each cylinder. When $V_k$ is greater than $V_n$ during the knock window interval, the knock indicated gated signal KIG will be "true."

Figure 10:
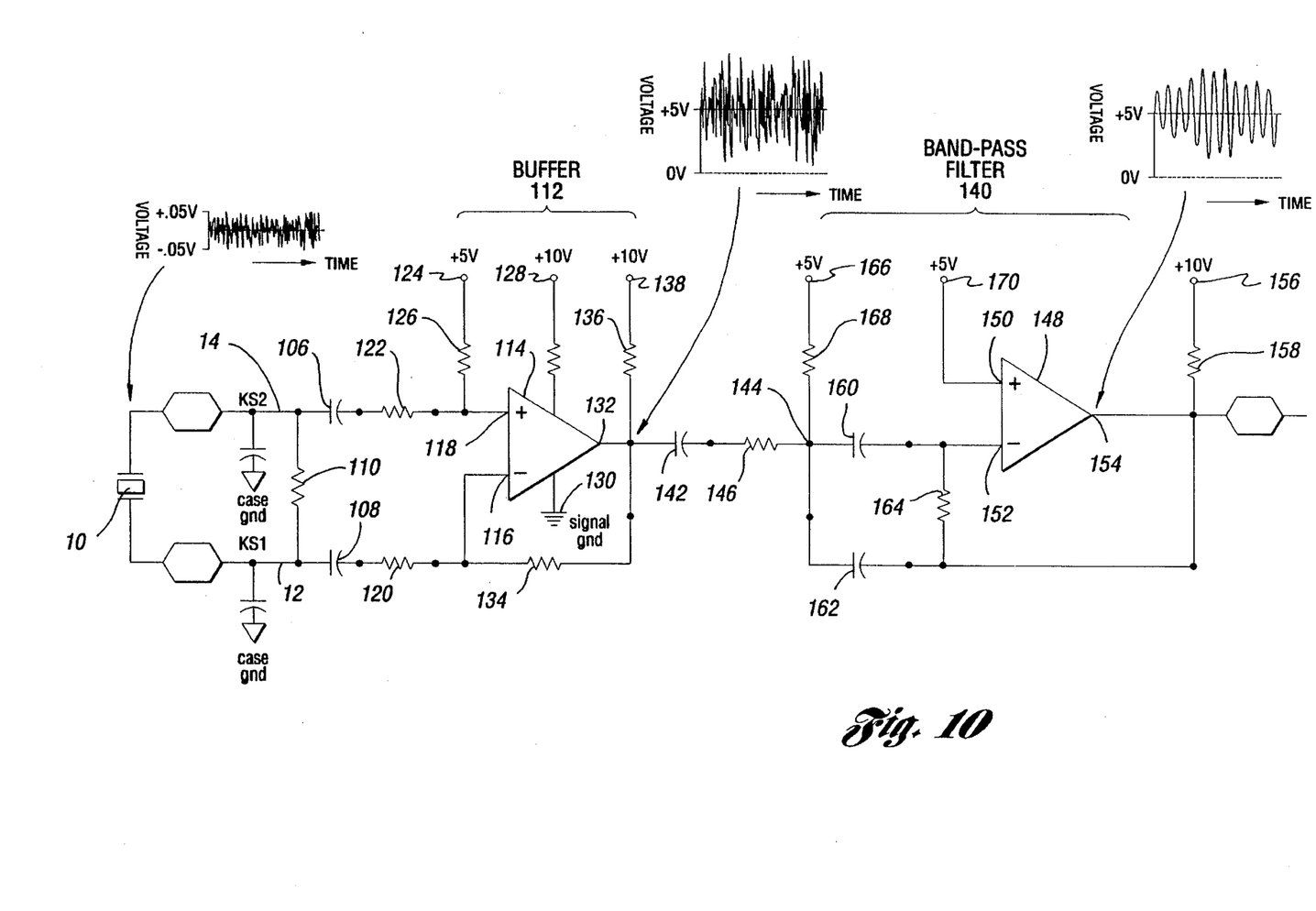
FIG. 10 is a diagram of the knock sensor, buffer and bandpass filter circuits located at the input side of the noise and knock channels.

As seen in FIG. 10, the knock sensor 10 develops a differential voltage in leads 14 and 12, providing maximum electrical noise rejection.

The frequency response of the sensor is characterized as flat and is, therefore, adaptable for use at several mounting locations, with various engines, and over different fundamental knock frequencies. To maintain a flat frequency response, the differential amplifier and drain resistor 110 provide sensor load, while capacitor 106 and capacitor 108 act as a DC block.

A buffer stage, identified by reference numeral 112, comprises a differential amplifier 114 with an inverting input pin 116 and a non-inverting input pin 118 connected respectively to capacitor 108 and capacitor 106 through the respective resistors 120 and 122. A reference voltage of 5 volts is provided as shown at 124. This reference voltage is connected through a resistor 126 to the non-inverting input pin 118 of the differential amplifier. An amplifier supply voltage source is shown at 128, and a companion ground is shown at 130. In the embodiment of FIG. 10, the supply voltage is ten volts.

The output point 132 is connected through a feedback circuit to the inverting input pin 116 through a feedback resistance 134. The output dynamic range is increased by using pull-up resistor 136 between the output point 132 and the ten-volt source 138.

The buffer is capacitively coupled to the bandpass filter stage 140 using a DC block in the form of a capacitor 142. The voltage source 138 and the pull-up resistor 136 allow the signal at output 132 to fluctuate around five volts, as indicated by the sketch of the signal wave indicated in FIG. 10. This is in contrast to the signal wave that is indicated in FIG. 10 for the output of the sensor 10, where the sensor voltage fluctuates around a zero-volt reference rather than a five-volt reference.

The input to the bandpass filter stage 140, shown at 144, is coupled to the capacitor 142 through a resistor 146. The bandpass filter 140 comprises an operational amplifier 148 having a non-inverting input pin 150 and an inverting input pin 152. The output 154 for the operational amplifier 148 is coupled through a multiple feedback circuit to the inverting input pin so that the operational amplifier is used in the inverting mode. A ten-volt pull-up, shown at 156, is connected to the output 154 through resistor 158. This increases the output dynamic range of the bandpass filter over the frequencies of interest. The feedback circuit for the operational amplifier 148 comprises capacitors 160 and 162 and a parallel resistance 164. The value of the impedance for these components, along with resistance of resistors 146 and 168, establishes the gain of the bandpass filter, control frequency, and bandwidth.

The bandpass filter 140 shapes the knock sensor signal and enhances the ability of the buffer to reject electrical noise. The result of this filtering function is a smoother sine wave output, as indicated in the diagram of FIG. 10 for the output terminal 154. The pull-up resistor 158 allows the sine wave output at 154 to oscillate about a five-volt value rather than a zero-volt value as in the raw sensor signal voltage.

The five-volt reference for the bandpass filter is shown at 166. This is connected to the input 144 across resistor 168. A five-volt bias is supplied to the non-inverting input pin 150 as shown at 170.

Figure 11:
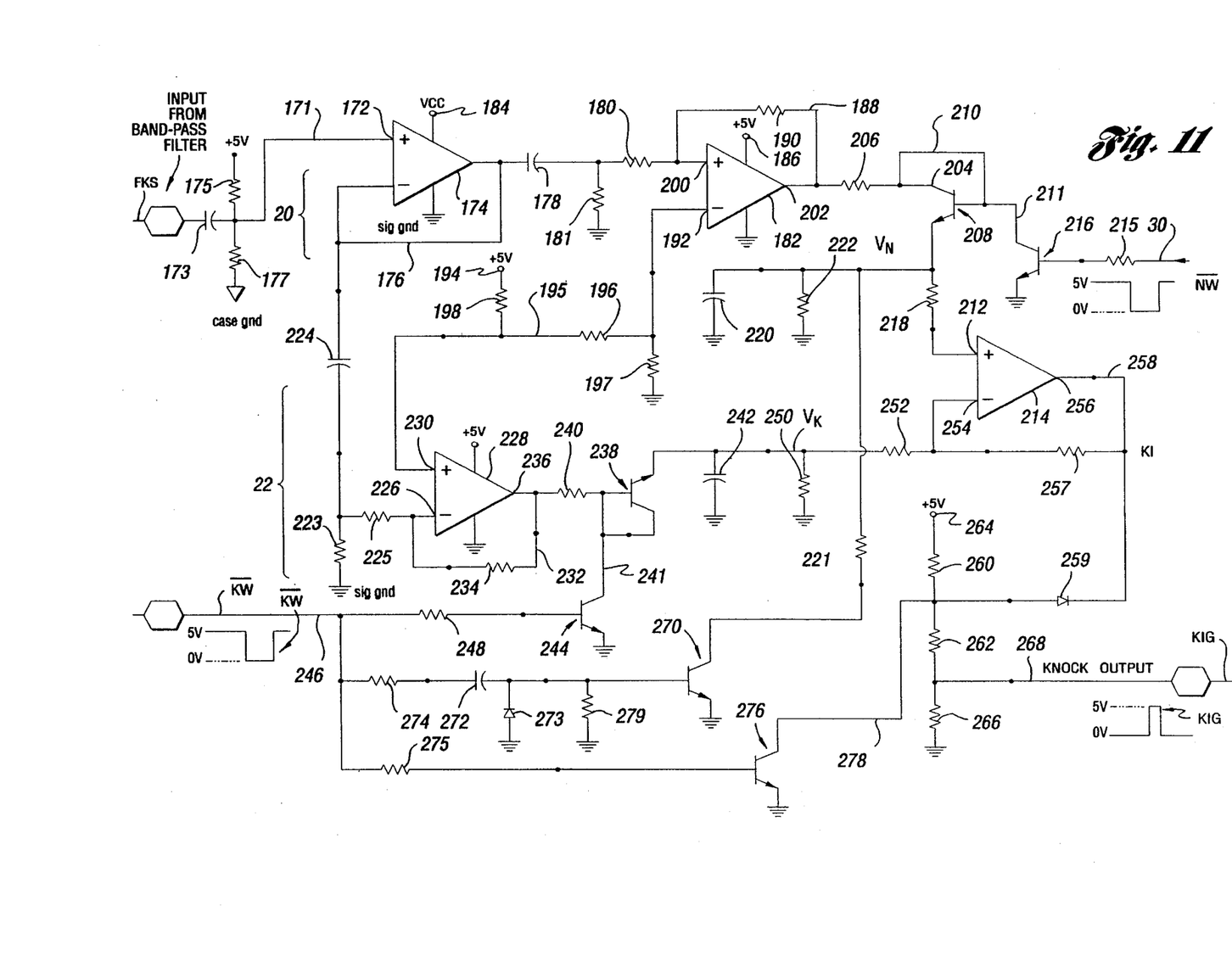
FIG. 11 is a circuit diagram showing the elements that comprise the noise and knock channels.

As seen in FIG. 11, the output 154 of the bandpass filter is capacitively coupled to the input follower 174. The pathway 171 between the bandpass filter and the processing channels is capacitively coupled at 173 and is offset and matched by paired resistors 175 and 177.

The components of the channels are illustrated in FIG. 11. The noise channel and the knock channel are isolated, one from the other, by virtue of the low output impedance of follower 224. This also prevents cross-talk or mutual interference between the channels.

The input to the noise channel is coupled to the output of the operational amplifier 174 through capacitor 178. The coupling provided by capacitor 178 is connected through a resistor 180 to the inverting terminal pin for operational amplifier 182.

A feedback pathway 188 for the operational amplifier 182 includes resistors 180, 181, and 190. This provides a gain factor for both input AC signal and DC bias at the non-inverting terminal 192. The bias voltage at 192 is provided by the five-volt source shown at 194, and by resistor network 196, 197, and 198. The inverting input terminal for the operational amplifier 182, as shown at 200, receives a signal input from the buffer amplifier and is offset by the bias voltage in circuit 188. The bias makes it possible always to forward-bias the transistor diode 208 in the absence of sufficient noise signal amplitude.

The output of the operational amplifier 182 feeds through resistor 206 to the collector of transistor 208, which functions as a switchable diode. Resistor 206 is used to load operational amplifier 182 and as a charging resistor for capacitor 220. The base of transistor 208 has two control pathways; i.e., pathway 210, a processed noise channel signal, and pathway 211, the collector of transistor 216. The base of switchable transistor diode 208 is under the control of transistor 216. The noise window gate of the microprocessor includes resistor 215 which turns transistor 216 on and off. This action either shunts the pathway 210 to ground or allows the pathway 210 to drive switchable transistor diode 208 to the "on" state to charge capacitor 220. When $N_w$ turns "off" transistor 216, the base of transistor 208 is turned "on" by the positive peaks of the AC signal of the noise channel through resistor 206 and charge capacitor 220. This causes a voltage $V_n$ that is representative of background noise. Resistor 218 connects the resulting charge voltage on capacitor 220 to the non-inverting input of comparator 214. Capacitor 220 has two discharge paths, a very slow path through resistor 222 and a quick discharge path provided by resistor 221 and transistor 270.

The presence of a noise window pulse created by the microprocessor will render the transistor 216 conductive, thereby short-circuiting the pathway 211 at the output of the operational amplifier 182. This interrupts the transfer of a noise signal to terminal 212 of the comparator 214. The emitter of the transistor 208 at the output side of the operational amplifier 182 is connected to the input terminal 212 through control resistor 218.

During the time that the noise window is open, capacitor 220 will be charged. The charging takes place whenever the transistor at the output side of the operational amplifier 182 is conducting. When the noise window ends, the charge $V_n$ will remain on capacitor 220 (see FIGS. 4 and 7). The high resistance at 222 will prevent fast leakage of $V_n$, as shown in FIG. 7 at 90. After the trailing edge of knock window $K_w$, the charge of capacitor 220 will be discharged quickly through resistor 221 by transistor 270. The charge on capacitor 220 has a unique value for each ignition event.

The charge voltage across capacitor 220 is the noise channel processed voltage $V_n$ which feeds the comparator 214. Feeding the inverting side of comparator 214 is the processed knock channel signal $V_k$. The knock channel gets its input signal from the buffer stage 174 through blocking capacitor 224. The filtered knock sensor spectrum is connected through resistor 225 to the inverting input of operational amplifier 228.

A feedback path 232 for the operational amplifier 228 includes resistors 234, 225 and 223. This provides a gain factor for both signal inputs; i.e., the AC signal at the inverting terminal 226 and the DC bias at the non-inverting terminal 230. The knock channel bias at 230 is provided by five-volt reference 194 and resistor 198. The bias is sufficient always to forward-bias the base of the transistor diode 238 to minimize any offset error.

The output of operational amplifier 228 is a composite signal of the DC bias plus the AC knock sensor signal feeding through resistor 240 to the base of transistor 238, which is tied to the collector of transistor 238. Transistor 238 functions as a switchable diode.

Resistor 240 is used as a load for operational amplifier 228 and as a charging resistor for capacitor 242. The base of transistor 238 has two control pathways; i.e., pathway 239, a processed knock channel signal, and pathway 241, the collector of transistor 244. The base of transistor 238 is under the control of transistor 244. The knock window gate of the microprocessor is defined in part by resistor 248, which turns transistor 244 "on" and "off". This action either shunts the pathway 241 to ground or allows the pathway 241 to drive switchable transistor diode 238 to the "on" state to charge capacitor 242. When $K_w$ turns "off" transistor 244, the base of transistor 238 is turned "on" by the positive peaks of the AC signal of the knock channel through resistor 240 and charge capacitor 242. This results in voltage $V_k$, the processed knock signal. Resistor 252 connects the resulting charge voltage on capacitor 242 to the inverting input of comparator 214. Capacitor 242 has a single discharge path through resistor 221, providing a quick discharge between cylinder events, as shown in FIG. 8.

When the processed signal $V_k$ is present in capacitor 242, it is distributed through resistor 252 to the non-inverting input terminal 254 of the comparator 214. The comparator determines whether the signal at 254 exceeds the value of signal $V_n$ at 212 received from the capacitor 220. If it exceeds that value, a knock indicated signal KI is developed at the output terminal 258 for comparator 214. The signal KI is coupled back to terminal 254 through resistor 257 to add a hysteresis loop to the $V_k$ detection. That signal is distributed through the pathway at 258 to a discrete "and" circuitry consisting of diode 259, resistors 264, 260, 262 and 266, and transistor 276. The output signal will be "high" when KI at 258 is "high" and the knock window $K_w$ is "true." Only during the knock window gate will the engine vibration indicate a harshness that is identified with knock. The output signal is used by the microprocessor to develop a spark retard adder in line 52 of FIG. 1 that will eliminate a knock condition.

The operating condition of transistors 244, 270 and 276 is under the control of the knock window $K_w$ received over pathway 246 from the microprocessor 30. Transistor 244 opens the knock channel when its base is turned off by the knock window pulse delivered through isolation resistor 248. The trailing edge of the knock window (rising edge) is delivered through resistor 274 and capacitor 272 to "glitch on" transistor 270, thereby rendering the transistor 270 conductive for a short period of time. This time is determined by resistor 279 and grounded diode 273. This provides a noise channel dump, which quickly discharges capacitor 220, thereby conditioning the system for the initiation of subsequent crank angle reference pulses. The next crank angle reference pulse then initiates the start of a new knock signal measurement process in the manner previously described. The discharge of the capacitor 220 can be observed in FIG. 7 where the charge decays from a "high" value beginning at the termination of the knock window indicated in FIG. 5.

Transistor switch 276 has its base connected to the knock window lead 246 through isolation resistor 275. When the knock window signal is "high", the transistor 276 becomes conductive, thereby providing a "low" to the "and" circuit described previously. The switch 276 prevents a knock-indicated signal outside the knock window $K_w$. After each ignition event, the system returns to a null state. It then is initialized to take a fresh look at the next ignition event.

There is no averaging of the noise signal, as in the case of certain prior art circuits. During each ignition event, a new noise value is processed. Both the noise window $N_w$ and the knock window $K_w$ can be varied depending upon engine vibration transmittability for any particular engine cylinder to the knock sensor. The noise windows and the knock windows are unique for each cylinder.

It can be observed in FIG. 3 that the pressure pulse corresponding to cylinder 4 has a higher peak value than the pressure pulses for cylinders 1, 3 and 2. This results in the presence of a knock signal, shown at 88 in FIG. 9, that is developed because of the pulsations indicated in FIG. 6 at zone 86. The presence of detonation causes pressure oscillations in cylinder 4, as seen in FIG. 3, during that particular combustion event. This results in knock and will initiate an adjustment of the spark advance so that pulse 88 will be eliminated during subsequent combustion events for cylinder 4.

Various modifications of the preferred embodiment described here will be apparent to persons skilled in the art and may be made without departing from the scope of our invention.

Having described a preferred embodiment of our invention, what we claim and desire to secure by U.S. Letters Patent is:

1. A knock detector system for controlling combustion variables for a spark ignition internal combustion engine including an accelerometer mounted in proximity to one of multiple engine combustion chambers, said accelerometer responding to vibrations transmitted to it from said engine to produce random signals of varying frequency and varying amplitude, operating variables for said engine including speed, throttle positions and temperatures at instantaneous crankshaft angles;

an electronic, digital, microprocessor means engine controller including an arithmetic and logic portion and a memory portion for repetitively storing in said memory values for said operating variables and corresponding crankshaft angle values during each successive control loop;

an electronic circuit means for creating electronic voltage processing channels for crankshaft angle reference signals, one of said channels being adapted to transfer and to modify a first sample of said random signals upon initiation of a first of said crankshaft angle reference signals and a second of said channels being adapted to transfer and to modify a second sample of said random signals during crankshaft angle reference signals subsequent to the transfer of said first sample of random signals;

arithmetic and logic portions of said microprocessor means including means for comparing the magnitude of the random signals in said first and second channels; and said electronic microprocessor means further including means for adjusting at least one of said variables in response to detection of a signal in said second group whose amplitude exceeds the amplitude of signals in said first group whereby unwanted detonation in said combustion chambers is avoided.

2. The combination as set forth in claim 1 wherein said system includes an electronic buffer and frequency filter means for amplifying said random signals generated by said accelerometer, said microprocessor including means for discriminating between signals of said accelerometer due to extraneous noise and signals due to said detonation.

3. The combination as set forth in claim 1 wherein said arithmetic and logic portion includes means for establishing and interrupting said transfer of random signals in said first channel following initiation of said first crankshaft angle reference signal and to establish and to interrupt said transfer of random signals in said second channel at an instant following the interruption of said transfer of signals in said first channel.

4. The combination as set forth in claim 2 wherein said arithmetic and logic portion includes means for establishing and interrupting said transfer of random signals in said first channel following initiation of said first crankshaft angle reference signal and to establish and to interrupt said transfer of random signals in said second channel at an instant following the interruption of said transfer of signals in said first channel.

5. A knock detector system for a spark ignition internal combustion engine having multiple cylinders with fuel combustion chambers comprising an accelerometer mounted on said engine adjacent one of said combustion chambers, said accelerometer responding to vibrations transmitted to it from said combustion chambers to produce random signals of varying frequency and varying amplitude, operating variables for said engine including speed, throttle position and temperature at instantaneous crankshaft angles;

an electronic, digital, microprocessor means engine controller including an arithmetic and logic portion and a memory portion for repetitively storing in said memory values for said operating variables and corresponding crankshaft angle values during each successive control loop;

electronic circuit means for creating electronic voltage processing channels for crankshaft angle reference signals, one of said channels being adapted to transfer and to modify a first sample of said random signals upon initiation of a first of said crankshaft angle reference signals and a second of said channels being adapted to transfer and to modify a second sample of said random signals during a crankshaft angle reference signal subsequent to the transfer of said first sample of random signals;

arithmetic and logic portions of said microprocessor means for comparing the magnitude of the random signals in said first and second channels; and said electronic processor means further including means for adjusting ignition timing of said spark ignition engine in response to a detection of a signal in said second sample where intensity exceeds the intensity of the signals in said first sample whereby detonation in said engine fuel combustion chambers is avoided.

6. The combination as set forth in claim 5 wherein said knock detector circuit includes means for transferring said random signals to each of said channels during the presence of each spark crankshaft angle reference signal for each of said cylinders and means whereby the transfer of said random signals through said first and second channels for each crankshaft angle reference signal for each cylinder is terminated before corresponding random signals are transferred through said first and second channels for a subsequent crankshaft angle reference signal for another cylinder whereby knock control data transferred to said microprocessor means is unique for each crankshaft angle reference signal and for each cylinder.

7. The combination as set forth in claim 5 wherein said detector circuit includes a buffered filter means for establishing an electrical interface between said accelerometer and said electronic circuit means for creating electronic voltage processing channels.

8. The combination as set forth in claim 6 wherein said detector circuit includes a buffered filter means for establishing an electrical interface between said accelerometer and said electronic circuit means for creating electronic voltage processing channels.

\* \* \* \* \*